United States Patent [19]
Häfner

[11] Patent Number: 5,359,900
[45] Date of Patent: Nov. 1, 1994

[54] APPARATUS FOR MEASURING THE MASS THROUGHPUT OF A FLOW OF POURABLE MATERIAL ACCORDING TO THE CORIOLIS PRINCIPLE

[75] Inventor: Hans W. Häfner, Aichach-Walchshofen, Germany

[73] Assignee: Pfister GmbH, Augsburg, Germany

[21] Appl. No.: 961,952

[22] Filed: Oct. 16, 1992

[30] Foreign Application Priority Data

Oct. 17, 1991 [DE] Germany .................. 4134318

[51] Int. Cl.⁵ ..................................... G01F 1/82
[52] U.S. Cl. ..................................... 73/861.37
[58] Field of Search .......... 73/861.36, 861.37, 861.38

[56] References Cited

U.S. PATENT DOCUMENTS

| | | | |
|---|---|---|---|
| 2,771,772 | 11/1956 | Kirwan | 73/861.38 |
| 2,771,773 | 11/1956 | Wallace | 73/861.38 |
| 3,331,244 | 7/1967 | Henderson | 73/861.38 |
| 4,700,578 | 10/1987 | Fassbinder | 73/861.37 |
| 4,805,462 | 2/1989 | Labschies | 73/861.36 |

FOREIGN PATENT DOCUMENTS

925622 7/1949 Germany .................. 73/861.36

Primary Examiner—Herbert Goldstein
Attorney, Agent, or Firm—Armstrong, Westerman, Hattori, McLeland & Naughton

[57] ABSTRACT

A Coriolis flow meter includes a measuring wheel which is driven by a motor. The measuring wheel has interior and exterior walls configured as cones with a plurality of guide blades extending between the walls. The center lines of the guide blades are at an acute angle with respect to the axis of the measuring wheel. A torque measuring device measures changes in driving torque of the motor. In one embodiment the measuring wheel is mounted on a cantilever laterally projecting out of the housing and supported at its exterior end on a load cell of the torque measuring device.

25 Claims, 5 Drawing Sheets

APPARATUS FOR MEASURING THE MASS THROUGHPUT OF A FLOW OF POURABLE MATERIAL ACCORDING TO THE CORIOLIS PRINCIPLE

TECHNICAL FIELD

The invention relates to an apparatus for measuring the mass throughput of a flow of pourable material, preferably conveyed pneumatically, according to the Coriolis Principle.

BACKGROUND OF THE ART

The German Patent Application Publication No. 25 44 976 discloses such an apparatus for determining the mass throughput of pourable material, as lime dust or fine ore. The measurement is based on the effective inertia force, i.e. Coriolis force, caused by moving mass particles hitting a rotating reference body, as a measuring wheel comprising a rotating disk bearing radially extending guiding blades thereon, the pourable material being hurled off essentially vertical in respect of the axis of rotation. Changes in the driving torque are used as measurement value for determining the mass throughput which at constant angular speed of the measuring wheel is directly proportional to the measured torque. For detecting torque changes the known apparatus uses the power consumption of the driving motor.

Similar apparatuses are known from the German Patent Application Publications No. 33 46 145 and No. 39 40 576, where instead of measuring the power consumption of the driving motor the latter is supported pivotally or rotationally, respectively, and the reaction torque is directed to a laterally arranged load cell.

The known apparatuses based on measuring Coriolis forces are limited in throughput in view of the steep deflections by 90° in the charging region of the measuring wheel and by almost 180° in the discharging region of the guiding blades. In particular in connection with a pneumatic conveyance and high charging speeds there are caused uncontrolled bouncing effects onto the rotating measuring disk, detrimental for the measuring accuracy.

Furthermore, sticky materials easily tend to deposit on the measuring wheel, resulting in an unbalance thereof.

SUMMARY OF THE INVENTION

It is an object of the present invention to provide an apparatus for measuring the mass throughput of a flow of pourable material according to the Coriolis principle, having an increased measuring accuracy.

It is a further object of the present invention to provide an apparatus for measuring the mass throughput of a flow of pourable material according to the Coriolis principle, having a simple design and needing a reduced maintenance.

It is a still further object of the present invention to provide an apparatus for measuring the mass throughput of a flow of pourable material according to the Coriolis principle, featuring a reduced wear and, consequently, having a longer lifetime.

These and other objects of the present invention are achieved by an apparatus for measuring, according to the Coriolis principle, a mass throughput of a flow of pneumatically conveyed pourable material, comprising: a measuring wheel means driven by a driving motor and rotating in a housing, which measuring wheel means comprises a cone-type interior wall and a cone-type exterior wall with guide blades extending therebetween for deflecting said flow of material from an axial charging direction into a spin-off movement all around a periphery of said measuring wheel means, the center lines of said guide blades extending at an acute angle in respect of an axis of said measuring wheel means; and a torque measuring means for determining changes of a driving torque caused by said driving motor, which changes occur during flow of said material through said measuring wheel means, as a measuring value for determining said mass throughput, wherein said rotating disk means is formed as a cone-type space between an interior wall and an exterior wall and with the center line of said guide blades formed therebetween extending at an acute angle in respect of the axis of said measuring wheel means.

According to another aspect of the invention an apparatus for measuring, according to the Coriolis principle, the mass throughput of a flow of pourable material comprises a mass throughput of a flow of pneumatically conveyed pourable material, comprising: a measuring wheel means driven by a driving motor and rotating in a housing for deflecting said flow of material; and a torque measuring means determining changes of a driving torque caused by said driving motor and occurring during flow of said material through said measuring wheel means as a measuring value for determining said mass throughput; wherein said measuring wheel means is mounted at a cantilever means projecting out of said housing and supported at its free exterior end on a force measuring means of said torque measuring means.

The conical design of the measuring wheel results in an excellent aerodynamic guidance of the flow of pourable material with smooth deflections thereof in the charging and discharging regions. Even sticky material does not deposit on the measuring wheel, and friction is considerably reduced. The angle of the arrow shape of the measuring wheel is preferably selected such that depending on the charging speed and the centrifugal acceleration the particles of the material flow essentially follow the center-line of the guiding blades, which center line is adapted to the resultant of the axial and radial speeds such that the conveyed material is conveyed outward with lowest possible contact to the interior and exterior walls of the measuring wheel.

With a preferred embodiment of the apparatus of the invention the measuring wheel is supported by a laterally extending cantilever arm with easy access to the load cell and a high force transmission ratio increasing accuracy.

Further objects, features, and advantages of the apparatus according to the invention will become more apparent from the following description of preferred embodiments, by way of example, referring to the accompanying drawings.

BRIEF DESCRIPTION OF THE DRAWINGS

FIG. 1 is a longitudinal section through a Coriolis force measuring apparatus using a measuring wheel;

BEST MODE TO CARRY OUT THE INVENTION

FIG. 1 shows a Coriolis force measuring apparatus 1 in longitudinal section, as particularly adapted for incorporation in pneumatic feeding systems for capturing a flow of mass material. Material to be conveyed enters through a charging region 2 into a cone-type measuring wheel 4 driven by a driving shaft 3. The measuring wheel 4 in a form of a rotating disk comprises radial guiding blades 5 deflecting the entering conveyed material out of the axial direction and accelerating it up to a discharging edge 15. The conveyed material is discharged all around the periphery of the measuring wheel 4 and is conveyed further within a housing 16, as illustrated in the upper half of the measuring apparatus 1 in phantom lines. According to the Coriolis principle the mass of the flowing conveyed material causes a reaction moment onto the measuring wheel 4 and its driving motor 8, respectively, which is supported on a load cell 7 by forming a lever projecting downward here. In this connection, the measuring wheel 4 and the driving motor 8 are journaled rotatably in double-pivoting bearings 6 such that there is formed a torque measuring device 9 detecting the change in driving torque caused during material passage as a measuring value for determining the mass material flow.

Upstream of the charging region 2 of the measuring wheel 4 there is provided a flow rectifier 10 adapted to ensure a non-twisting flow-in onto the measuring wheel 4. The interior ends of the guiding blades 5 extend up to the charging region 2, where they are cranked or bent off in peripheral direction, as illustrated in more detail in FIG. 2. According to the solution the measuring wheel 4 is designed in the form of an arrow head with a cone-type interior wall 14 and a cone-type exterior wall 13 covering the guiding blades 5 at their side edges. The center-line 12 of the guiding blades 5 is formed between the interior wall 14 and the exterior wall 13 and is arranged at an acute angle x in respect of the driving shaft or axis 3 of the measuring wheel 4. This arrow angle x here is about 30°; however, it may be selected larger, too, as will be explained in connection with FIGS. 3 and 4.

Within the interior wall 14 there is formed a bearing housing 17 supporting the two pivoting bearings 6 and enclosing the motor 8 as well as the torque measuring device 9 including the load cell 7. The bearing housing 17 is supported via supporting ribs 19 formed in a type of a flow rectifier as well. Furthermore, a duct 18 extending outward is provided, serving for air supply to the driving motor 8 and for receiving the electrical cable and the measuring leads from the load cell 7 outward.

The Coriolis force measuring apparatus 1 illustrated here, is particularly adapted for incorporation into pneumatic feeding systems, where the alignment may almost be randomly. Thus, the measuring apparatus 1 illustrated here, may be arranged vertically as well. In the vertical arrangement the measuring apparatus 1 may directly be placed below a bin for pourable material, resulting in a favourable flow in view of the arrow-type form of the measuring wheel 4. With such an arrangement, as compared with known disk-type measuring wheels, there is of advantage that in rest position of the driving motor 8 and, consequently, the measuring wheel 4, no conveyed material will remain on the cone-type interior wall 14 of the measuring wheel 4 and stick there in the case of adverse conditions, as may happen with an intermittent operation of metering systems.

Figure 2A:
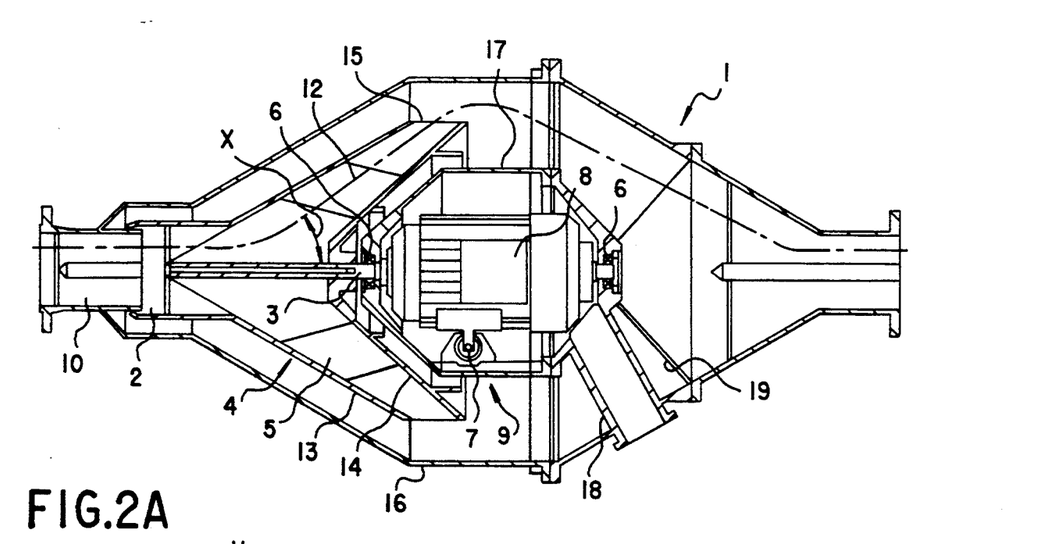
FIG. 2 is a plan view onto the measuring wheel according to FIG. 1, including a separately shown guiding blade for better illustration.
Figure 2B:
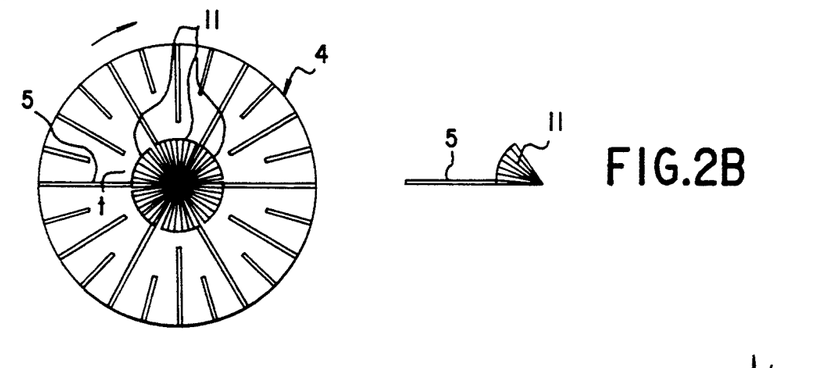

FIG. 2 shows the measuring wheel 4 including its plurality of exactly radially arranged guiding blades 5 in a front view seen from the charging region 2, with the exterior wall 13 omitted. Here, the measuring wheel 4 is provided with six guiding blades 5 extending up to the center of the measuring wheel 4, with a corresponding number of shorter guiding blades being provided in the intermediate sectors. The guiding blade designated with the reference numeral 5, is separately shown in the right portion of FIG. 2 for better illustration. At the inner end the guiding blade 5 is provided with a cut-off surface 11 having an about triangle form, which surface is bent off by about 45° in respect of the main surface of the guiding blade 5 extending normal to the drawing plane. This cut-off edge in tangential direction, which may extend from the center up to about the middle of the exterior wall 13, is directed in peripheral direction, with the front edge of the cut-off surface 11 projecting from the drawing plane. Hereby, supplied conveyed material is moved-in into the individual sectors between the radial guiding blades 5 between the individual cut-off surfaces 11, by imposing a tangential acceleration t. In view of these cut-off surfaces 11 a tangential acceleration t is imposed onto the conveyed material immediately upon entering into the measuring wheel 4 such that a hard bouncing of material onto the interior wall 14 or onto the guiding blades 5 can practically not happen. The cut-off angle of the cut-off or edging surface 11 corresponds, for achieving an essentially smooth introduction, to the resultant of the axial entering speed of the conveyed material and the tangential peripheral speed of the guiding blades 5. This permits a particularly large entering cross section into the measuring wheel 4 as well.

Figure 3:
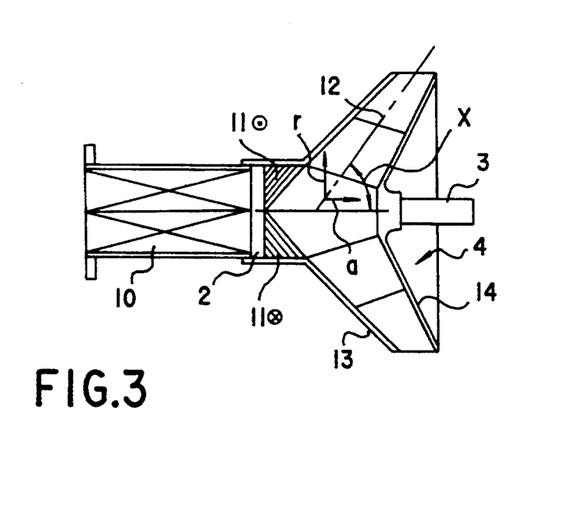
FIG. 3 is a modified embodiment of the measuring wheel of FIG. 1.

FIG. 3 shows the further path of movement through the measuring wheel 4. In view of the staggering or crossing of the cut-off surfaces 11, provided here with the usual arrow symbols, the upper pointing to the viewer, whilst the lower points into the drawing plane, already in the center a considerable radial speed r is achieved, such that the diameter of the measuring wheel 4, due to this early starting radial acceleration, may be selected smaller as a whole, or the angular speed may be reduced. Furthermore, the axial entering speed a acts onto the particle of conveyed material exemplary illustrated here. The centerline 12 between the exterior wall 13 and the interior wall 14 is aligned such that the center-line 12 corresponds to the resultant of the axial and the radial speeds. This results in the fact that the conveyed material particles do not deposit on the interor and exterior walls 13, 14, but pass almost friction-free through the measuring wheel 4. The angle x of the center-line 12 here is about 50° such that this shape of measuring wheel is adapted for lower axial entering speeds, as compared with the acute arrow form in FIG. 1.

Figure 4:
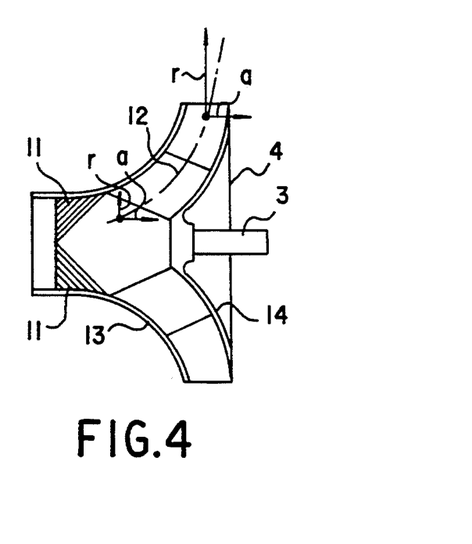
FIG. 4 is a further embodiment of the measuring wheel.

FIG. 4 shows a modified embodiment with the center-line 12 being formed in accordance with the quadratic increase of the radial speed r. In view of the curved shape this measuring wheel 4 is more difficult to be manufactured, f. i. by die casting, as compared with the measuring wheel to be made of sheet material and having smooth surface limitations; however, it is adapted more exactly to the flowing conditions. In order to avoid a too strong radial direction of the resultant, it is of advantage that with the crossed cut-off surfaces 11 an increase of the axial speed may be achieved as well, such that a too strong deflection into the radial direction may be avoided with this measuring wheel design. It should be noted that with such a design of the measuring wheel a considerable conveying or blowing effect may be achieved such that by changing the rotational speed of the measuring wheel 4 the suction effect from an injector and, consequently, the mass throughput of the conveyed material are adjustable.

Figure 5A:
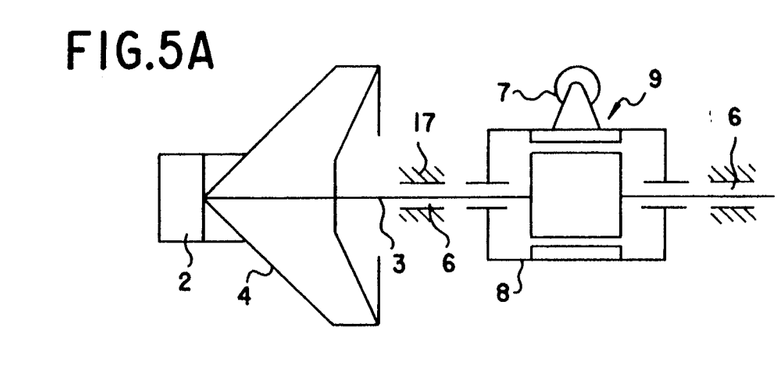
FIG. 5 is a schematic illustration of the support arrangement of the measuring apparatus according to FIG. 1, including an associated view turned by 90° at the left-hand side.
Figure 5B:
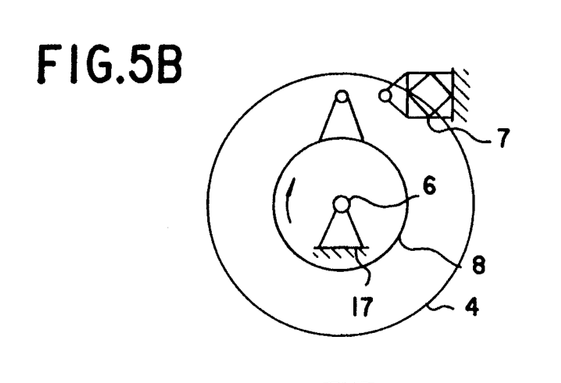

FIG. 5 schematically illustrates the bearing arrangement of the double-pivoting bearing 6 of FIG. 1. As shown, the driving shaft 3 of the measuring wheel 4, in addition to the bearing in the driving motor 8, is supported laterally pivotable in the double-pivoting bearings 6 within the bearing housing 17, such that the reaction moment may act onto the load cell 7. Since the driving shaft 3 rotates, the friction of the pivoting bearing 6 is essentially lower, as compared with a bearing arrangement around the practically stationary motor housing of the driving motor 8, such that even small reaction moment changes and, therefore, material flow changes may be determined at the load cell 7. In the left portion of the figure, the corresponding elevational view is illustrated.

Figure 6A:
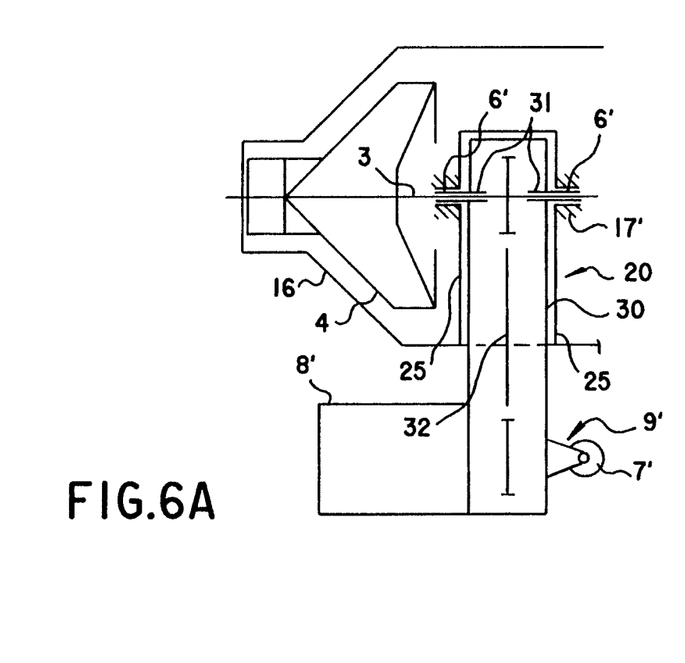
FIG. 6 is a schematic elevational view of the measuring apparatus according to a second embodiment, with an associated view turned by 90°.
Figure 6B:
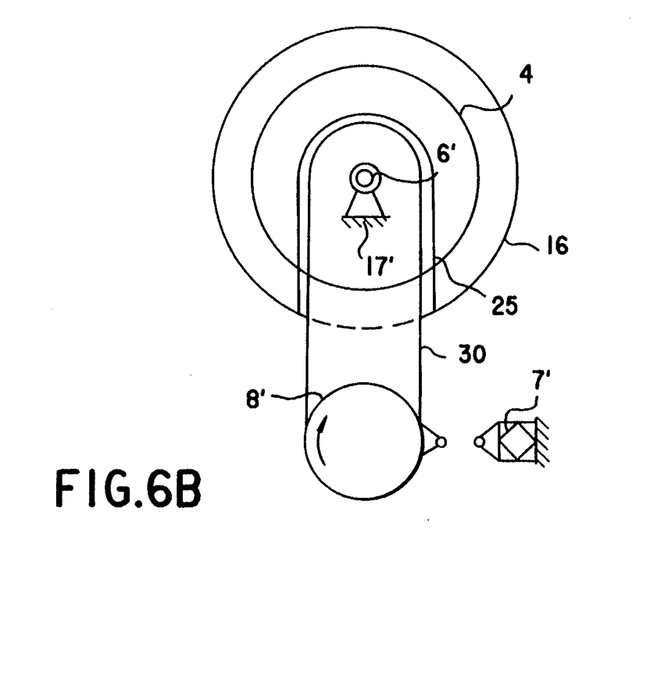

FIG. 6 shows a particularly advantageous embodiment with a cantilever 20, here in the form of a gearing housing 30 for a gearing, here a belt-drive 32, which cantilever extends laterally outward from housing 16 and is supported on a load cell 7'. The gearing housing 30 is fitted, in a loose-fitting manner, into a closed stack-type recess 25 of the housing 16, which recess 25 forms in a center the bearing housing 17' for the driving shaft 3 of the measuring wheel 4, designed according to the embodiment of FIG. 1 resp. FIG. 5 and therefore illustrated merely schematically.

Since the gearing housing 30 must slightly be pivotable for torque transmission onto the load cell 7' as the only direction of free movement, it is rotatably mounted in the center, opposite the bearing housing 17' at the inner end of the recess 25, by means of pivoting bearings 6' and bearing studs 31. A driving motor 8' is arranged outside of the housing 16 such that it may be serviced in a simple manner, if necessary, as well as the load cell 7'. Furthermore, the large lever arm of the gearing housing 30 results in a corresponding transmission ratio and, therefore, in an improved measuring accuracy. As a gearing 32 here a toothed belt-drive is provided; however, there may be a hydraulic gearing as well, such that only the supply ducts in the gearing housing 30 extend inwardly and, therefore, the housing 30 may be designed correspondingly narrower.

Figure 7A:
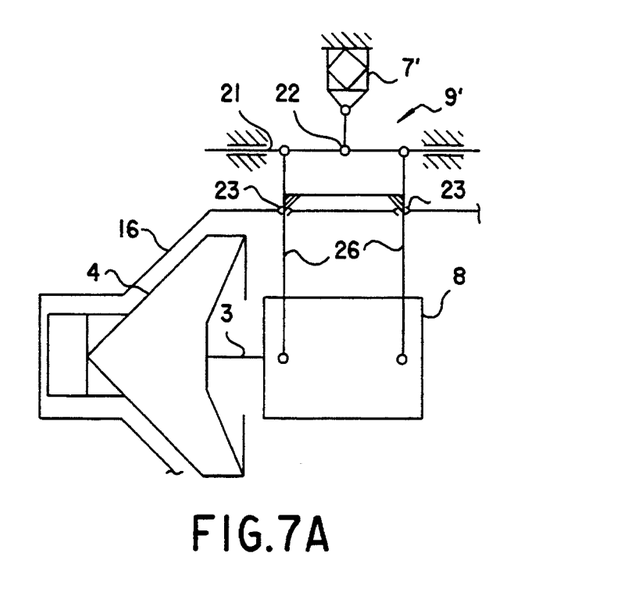
FIG. 7 is a modified embodiment according to FIG. 6.
Figure 7B:
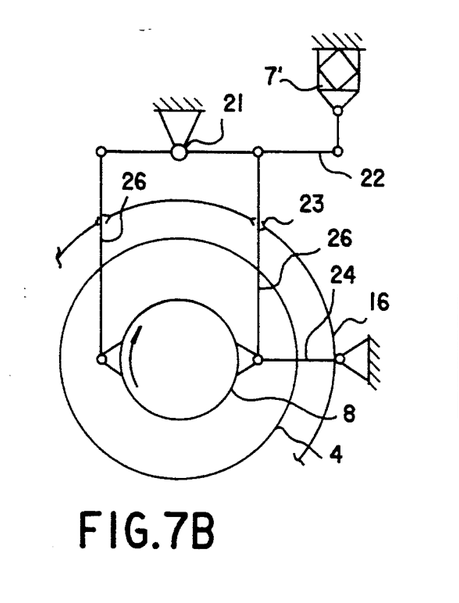

FIG. 7 illustrates a modified embodiment, provided with a parallelogram-type lever linkage 26 for the cantilever 20 and having mounted thereon the centrally arranged motor 8 and the measuring wheel 4 (identical with FIG. 1). For fixing the driving motor 8, there is provided a coupling arm 24 extending off-set by 90°, and the upper lever (right figure portion) is bifurcatedly formed. The levers 26 are mounted at a supporting axle 21 via a further lever arm 22, such that the reaction moment of the measuring wheel 4 acts onto the load cell 7' for torque detection via the driving motor 8, the parallogram lever 26, and the lever arm 22. The levers 26 here project out of the housing 16 at elastic passages 23, however, they may be arranged as well in corresponding recesses 25, as in FIG. 6, in a minimally loose-fitting manner.

Again, by means of the lever linkage 26 a corresponding transmission ratio and, therefore, an improved response of a torque measuring device 9' is achieved, the more so such levers 26 are journaled almost friction-free. The support axle 21 preferably is designed as a friction-free crossing spring hinge.

Figure 8A:
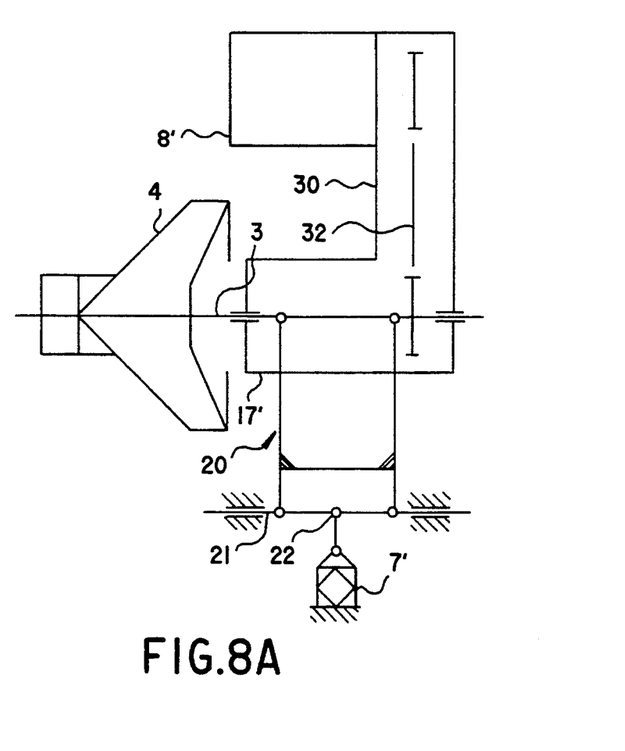
FIG. 8 is a combination of the embodiments of FIGS. 6 and 7.
Figure 8B:
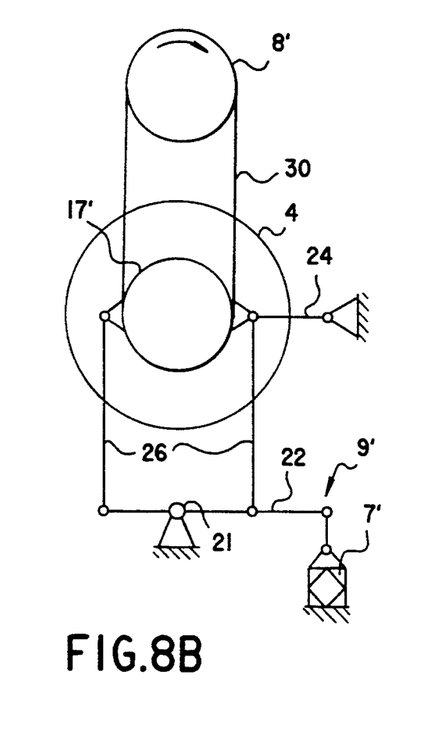

FIG. 8 shows a further embodiment as a combination of FIGS. 6 and 7. In this connection, the cantilever arm 20 in the form of the gearing housing 30 including gearing 32 and the externally arranged driving motor 8', is journaled in the center, i.e. at the bearing housing 17' for the measuring wheel 4, through the parallalogram-type lever linkage 26 extending from the other side. Since there are no further parts in the center than the bearing housing 17' absolutely necessary for the measuring wheel 4 and shown enlarged, the moment of inertia of this arrangement is particularly small, such that even small reaction moment changes may be determined at the load cell 7'. This permits a particularly exact adjustment of a desired flow of material, as it is of advantage for various metering processes for pourable materials. The housing 16 is not shown; however, it would enclose at narrow distance the measuring wheel 4, as also shown in FIGS. 6 and 7.

Figure 9A:
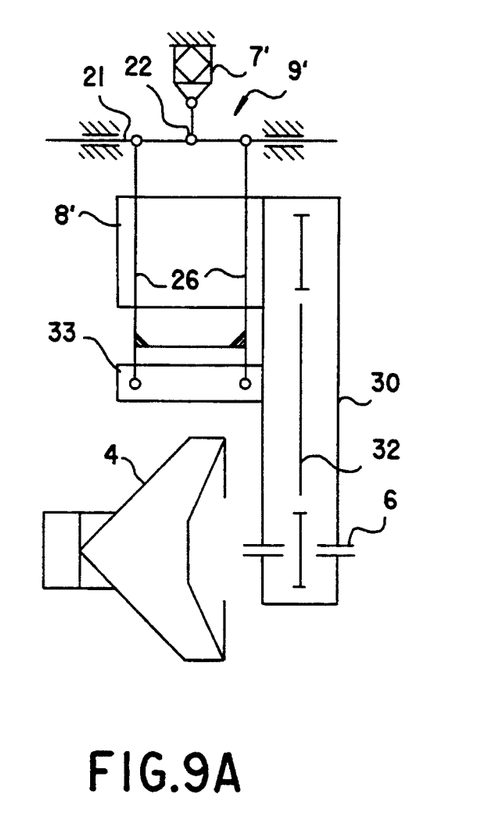
FIG. 9 is a modified embodiment according to FIG. 8.
Figure 9B:
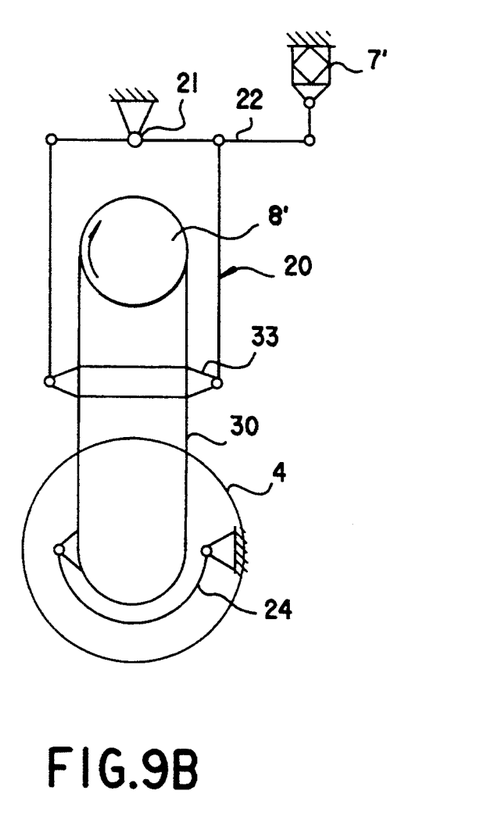

FIG. 9 shows a further embodiment, where the cantilever arm 20 in the form of the gearing housing 30 is secured to the front ends of an again parallelogram-type lever linkage 26 via a laterally projecting support arm 33. Here, the lateral support arm 33 forms a virtual pivoting axis, with the driving motor 8', on the one hand, and the measuring wheel 4, on the other hand, being approximately balanced in respect of the support arm 33, such that again a sensitive detection of reaction moment changes is achieved.

Figure 10A:
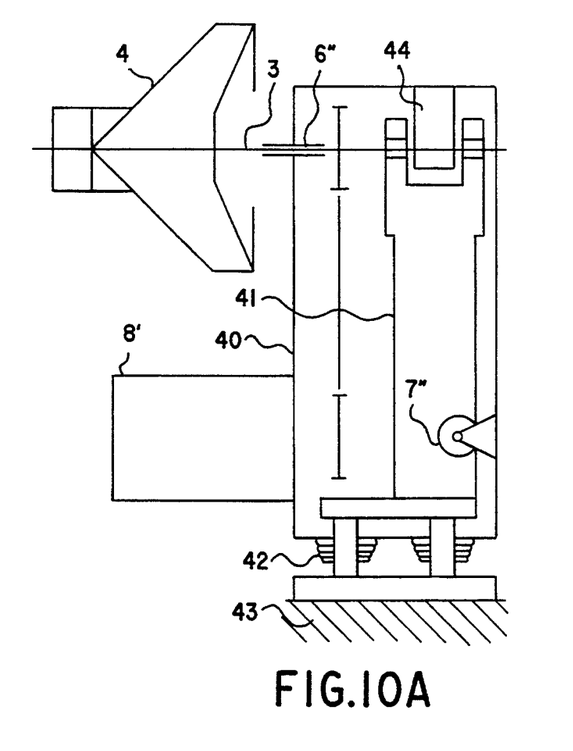
FIG. 10 is a further embodiment of the measuring apparatus.
Figure 10B:
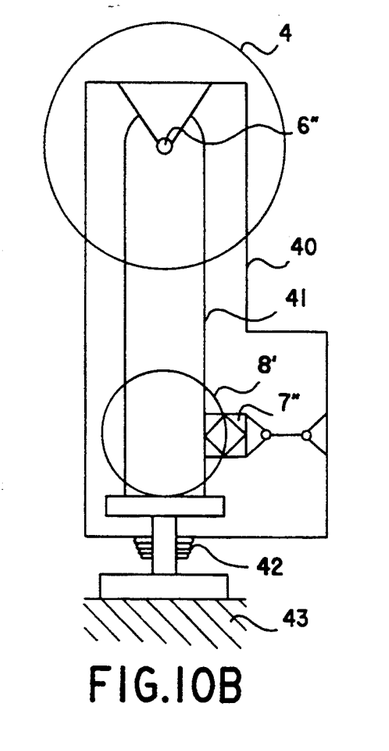

FIG. 10 illustrates a further embodiment of the measuring apparatus 1, with a cantilever 20 in the form of a stationary mounted support arm 41 extending into the center to the driving shaft 3 of the measuring wheel 4, which driving shaft 3 is supported in pivoting bearings 6". The support arm 41 is surrounded by a support housing 40 slightly pivotable by the reaction moment, which housing 40 is supported by means of a type of console 44 about the same axis and permits small excursion movements in respect of the base 43 carrying the support arm 41, due to elastic passages 42. In this connection, the support housing 40 again acts onto a load cell 7", connected here to the stationary support arm 41 and thus determining the relative pivoting movements of the support housing 40, due to changes of the reaction moments.

Figure 11:
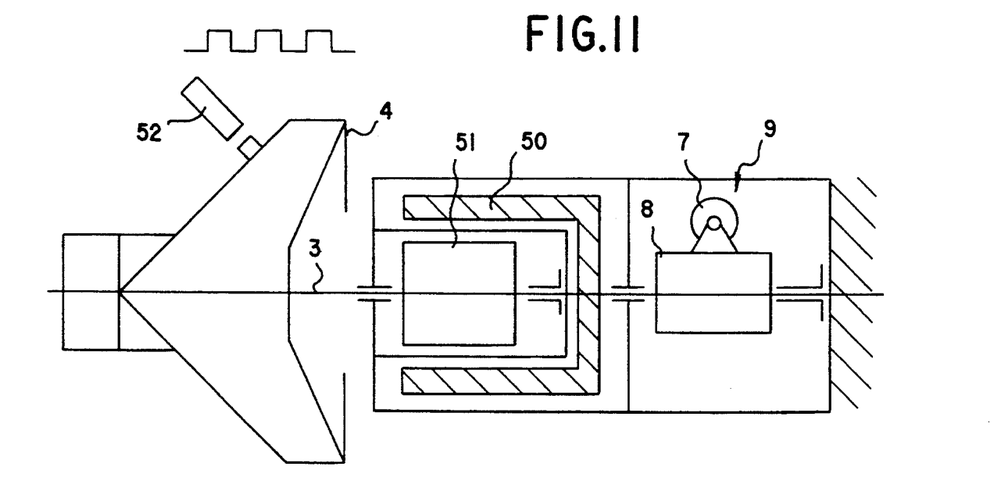
FIG. 11 shows a specific driving arrangement for the measuring apparatus.

FIG. 11 shows a specific driving arrangement, where the central driving motor 8 again supporting on a load cell 7 (identical with that of FIG. 1) via a cantilever arm drives the driving shaft 3 of the measuring rotor 4 via a pot-type magnet 50 and a magnetic rotor 51 arranged therein. The rotational speed of the measuring wheel 4 is monitored here by a pulse generator 52, such that the rotational speed of the measuring wheel 4 may exactly be controlled. The magnetic drive features a particular uniformity such that negative reactions onto the torque determination, as oscillations which may occur with a mechanically coupled drive, will be reduced. Furthermore, such a drive, due to the encapsulated design of the driving motor 8, is particularly adapted for conveyed material which may explode, as flour, for the preventing of flour dust explosions. As driving motors 8 in particular reluctance motors are adapted, since they permit maintaining an exact rotational speed, such that monitoring of the rotational speed of the measuring wheel 4 may be omitted. However, air or oil motors may be used as well; for example, a turbine wheel may be provided upstream of the measuring wheel 4, which turbine wheel will convert, in particular in pneumatic feeding systems, the flow energy into mechanical energy for driving the measuring wheel 4. It should be noted that in contrast to the prior art, where generally a constant angular speed of the measuring wheel is assumed, the suggested Coriolis force measuring apparatus may also be operated at a varying rotational speed and the rotational speed serves, in addition to the torque, for determining the throughput, in particular for adjusting to a desired mass throughput by product forming (M×n). Due to the suggested measures for increasing the measuring accuracy, even smaller deviations from a desired value may be detected. At the same time such measures, as the cone-type interior wall of the measuring wheel and its support at a lateral cantilever arm considerably reduce maintenance.

For further increasing the longtime stability of the measuring apparatus the measuring wheel may be formed as a ceramic part, despite the fact that up to now the manufacture of ceramic parts has been restricted to certain diameter limits. Since the suggested measuring wheel having curved guiding blades in the charging region permits a radial acceleration already with the entering of the particles of conveyed material, the overall diameter of the measuring wheel may be reduced in order to achieve a predetermined Coriolis force miminum measuring value. By means of increasing the measuring accuracy the wear condition may be improved, too, since with a higher measuring accuracy the rotational speed of the measuring value may be reduced, which in turn reduces the friction and wear at the measuring wheel.

While the invention has been particularly shown and described in reference to preferred embodiments thereof, it will be understood by those skilled in the art that changes in form and details may be made therein without departing from the spirit and scope of the invention.

I claim:

1. An apparatus for measuring, according to the Coriolis principle, a mass throughput of a flow of pneumatically conveyed pourable material, comprising:
   a measuring wheel means driven by a driving motor and rotating in a housing, wherein said measuring wheel means comprises an interior wall and ann exterior wall each configured as a cone with a plurality of guide blades extending between said interior and exterior walls for deflecting said flow of material from an axial charging direction into a spin-off movement all around a periphery of said measuring wheel means, the center lines of said guide blades extending at an acute angle, at an angle substantially less than 90°, with respect to an axis of said measuring wheel means, wherein said plurality of guide blades are connected to said interior and exterior walls, and are radially oriented; and
   a torque measuring means for determining changes of a driving torque caused by said driving motor, which changes occur during flow of said material through said measuring wheel means, as a measuring value for determining said mass throughput, wherein said measuring wheel means, which rotates, forms a space configured as a cone between an interior wall and an exterior wall and with the center line of said guide blades formed therebetween extending at an acute angle with respect to the axis of said measuring wheel means.

2. The apparatus of claim 1, wherein the direction of said center lines at said angle is a function of a resultant axial charging speed and radial speed of said conveyed material in said measuring wheel means.

3. The apparatus of claim 1, wherein said angle is between 30° and 60°.

4. The apparatus of claim 1, wherein said guiding blades are bent off in a rotational direction at the inner ends extending into a charging region of said measuring wheel means in which said conveyed material enters.

5. The apparatus of claim 4, wherein said bent-off surfaces extend at about 45° with respect to a rotational plane of said measuring wheel means.

6. The apparatus of claim 1, wherein said interior wall at least partially encloses a stationary bearing housing of said measuring wheel means.

7. The apparatus of claim 6, wherein said bearing housing houses and encloses said driving motor and said torque measuring means.

8. The apparatus of claim 1, wherein said torque measuring means supports said measuring wheel means, and wherein said torque measuring means comprises a bearing which is directly arranged on a driving shaft of said measuring wheel means.

9. The apparatus of claim 8, wherein said bearing is arranged at end sides of said bearing housing.

10. The apparatus of claim 1, wherein a rotational speed of said measuring wheel means is controllable for adjusting a predetermined material throughput.

11. The apparatus of claim 10, wherein said measuring wheel means is a blower, and wherein said blower has a suction force which is variable dependent on a control of said rotational speed.

12. The apparatus of claim 1, wherein upstream of a charging region for said measuring wheel means there is provided a flow rectifier.

13. The apparatus of claim 1, wherein said driving motor drives a magnetic armature into which a magnetic rotor is inserted arranged on said shaft of said measuring wheel means.

14. The apparatus of claim 1, wherein said driving motor comprises a reluctance motor.

15. An apparatus for measuring, according to the Coriolis principle, a mass throughput of a flow of pneumatically conveyed pourable material, comprising:
   a measuring wheel means driven by a driving motor and rotating in a housing for deflecting said flow of material; and a torque measuring means determining changes of a driving torque caused by said driving motor and occurring during flow of said material through said measuring wheel means as a measuring value for determining said mass throughput, wherein said measuring wheel means is operably mounted to a drive shaft extending inside said housing and is operably mounted on a cantilever means laterally projecting out of said housing and operably mounted at a free exterior end thereof on a force measuring means of said torque measuring means.

16. The apparatus of claim 15, wherein said cantilever means is formed as a parallelogram-type lever linkage for constraining a movement of said baring housing supporting said wheel means of said driving motor.

17. The apparatus of claim 15, wherein said cantilever means is formed as a gearing housing, with said driving motor being arranged outside said housing and said gearing housing extending into a closed recess of said housing adapted thereto.

18. The apparatus of claim 17, wherein said gearing housing comprises bearing studs for a pivotable support on a shaft of said measuring wheel means.

19. The apparatus of claim 15, wherein said measuring wheel means rotates at a rotational speed depending on a predetermined material throughput.

20. The apparatus of claim 19, wherein said measuring wheel means is a blower, and wherein said blower has a suction force which is variable dependent on a control of said rotational speed.

21. The apparatus of claim 15, wherein upstream of a charging region for said measuring wheel means in which said conveyed material enters is provided with a flow rectifier.

22. The apparatus of claim 15, wherein said driving motor drives a magnetic armature into which a magnetic rotor is inserted arranged on said shaft of said measuring wheel means.

23. The apparatus of claim 15, wherein said driving motor comprises a reluctance motor.

24. An apparatus for measuring, according to the Coriolis principle, a mass throughput of a flow of pneumatically conveyed pourable material, comprising:
   a measuring wheel means driven by a driving motor and rotating in a housing for deflecting said flow of material; and
   a torque measuring means determining changes of a driving torque caused by said driving motor and occurring during flow of said material through said measuring wheel means as a measuring value for determining said mass throughput, wherein said measuring wheel means is operably mounted on a cantilever means projecting out of said housing and operably mounted at a free exterior end thereof on a force measuring means of said torque measuring means,
   wherein said cantilever means is formed as a parallelogram-type lever linkage for constraining a movement of said bearing housing supporting said wheel means of said driving motor.

25. An apparatus for measuring, according to the Coriolis principle, a mass throughput of a flow of pneumatically conveyed pourable material, comprising:
   a measuring wheel means driven by a driving motor and rotating in a housing for deflecting said flow of material; and
   a torque measuring means determining changes of a driving torque caused by said driving motor and occurring during flow of said material through said measuring wheel means as a measuring value for determining said mass throughput, wherein said measuring wheel means is operably mounted on a cantilever means projecting out of said housing and operably mounted at a free exterior end thereof on a force measuring means of said torque measuring means,
   wherein said cantilever means is formed as a gearing housing, with said driving motor being arranged outside said housing and said gearing housing extending into a closed recess of said housing adapted thereto.

* * * * *